United States Patent
Park

(10) Patent No.: US 10,516,564 B2
(45) Date of Patent: Dec. 24, 2019

(54) METHOD AND SYSTEM FOR FACILITATING THIRD PARTY CONNECTIONS

(71) Applicant: Jung Hun Park, Seattle, WA (US)

(72) Inventor: Jung Hun Park, Seattle, WA (US)

(*) Notice: Subject to any disclaimer, the term of this patent is extended or adjusted under 35 U.S.C. 154(b) by 177 days.

(21) Appl. No.: 15/692,385

(22) Filed: Aug. 31, 2017

(65) Prior Publication Data

US 2018/0062911 A1 Mar. 1, 2018

Related U.S. Application Data

(60) Provisional application No. 62/381,570, filed on Aug. 31, 2016.

(51) Int. Cl.
| | | |
|---|---|---|
| *H04L 12/24* | (2006.01) | |
| *H04L 12/58* | (2006.01) | |
| *H04L 29/06* | (2006.01) | |
| *G06F 3/0482* | (2013.01) | |

(52) U.S. Cl.
CPC .......... *H04L 41/026* (2013.01); *H04L 51/32* (2013.01); *H04L 63/0421* (2013.01); *G06F 3/0482* (2013.01)

(58) Field of Classification Search
CPC ... H04L 41/026; H04L 63/0421; H04L 51/32; G06F 3/0482
USPC .......................................................... 709/206
See application file for complete search history.

(56) References Cited

U.S. PATENT DOCUMENTS

| | | | |
|---|---|---|---|
| 9,276,908 B2 | 3/2016 | Johansson et al. | |
| 9,769,122 B2 | 9/2017 | Winner et al. | |
| 2004/0260653 A1 | 12/2004 | Tsuei et al. | |
| 2005/0027618 A1 | 2/2005 | Zucker et al. | |
| 2005/0114218 A1 | 5/2005 | Zucker et al. | |
| 2013/0013667 A1* | 1/2013 | Serena ................ | G06Q 10/10 709/203 |
| 2014/0013244 A1* | 1/2014 | Lindsay .............. | G06Q 50/01 715/753 |
| 2014/0164115 A1 | 6/2014 | Chan et al. | |
| 2014/0181009 A1* | 6/2014 | Alexander .......... | G06F 16/9554 707/609 |
| 2015/0052204 A1* | 2/2015 | Shrivastav .......... | H04L 51/32 709/206 |
| 2016/0134592 A1 | 5/2016 | Sedayao | |
| 2016/0239547 A1* | 8/2016 | Lim .................... | G06F 3/04842 |

(Continued)

*Primary Examiner* — Chris Parry
*Assistant Examiner* — Weiwei Y Stiltner
(74) *Attorney, Agent, or Firm* — Kanika Radhakrishnan; Evergreen Valley Law Group

(57) ABSTRACT

A method and system for facilitating third party connections is disclosed. A user selection generated from a User Interface (UI) of a user device of at least two parties in an application from a list of a plurality of parties present on the user device is received by a server system to create a connection between the at least two parties by a user. A set of privacy options is facilitated on the UI that includes an anonymous option representing an identity of the user as anonymous and a public option representing the identity of the user as visible to the at least two parties. A privacy option selected from the set of privacy options from the user device is received. Creation of the connection between the at least two parties in the application is facilitated. The connection created at least includes the privacy option selected by the user.

20 Claims, 8 Drawing Sheets

(56) References Cited

U.S. PATENT DOCUMENTS

2017/0132679 A1* 5/2017 Lind .................. G06Q 30/0609
2017/0308283 A1* 10/2017 Seif ..................... G06F 3/04883
2017/0316515 A1* 11/2017 Varma .................... G06Q 50/01
2017/0351766 A1* 12/2017 Lee ..................... G06F 16/9535

* cited by examiner

METHOD AND SYSTEM FOR FACILITATING THIRD PARTY CONNECTIONS

TECHNICAL FIELD

The present disclosure generally relates to establishing a social network for new introductions and connections and, more particularly, to a method and system for facilitating anonymous third party connections with minimal transition of sensitive data.

BACKGROUND

Conventionally, people used to network with one another by joining social clubs, attending social events, meeting friends through other friends, and so forth. One of the major benefits of the Internet has been the extent to which it has facilitated innovations in social interaction and social networking. Online social networking services have made keeping in touch with friends and acquaintances more convenient for many people and provide a social forum for networking and meeting new people. Online social networking services permit members (including people, businesses, and other entities) to create networks of friends or associates. For example, people can connect their contacts to each other (who would benefit from knowing each other) using social networking websites. In order to facilitate communications between the vast numbers of individuals, social networking websites can provide organizational tools for allowing these individuals to interact with one another via the social networking websites.

SUMMARY

Various embodiments of the present disclosure provide methods and system for facilitating third party connections.

In an embodiment, a computer-implemented method includes receiving, by a server system, a user selection of at least two parties in an application from a list of a plurality of parties present on a user device. The user selection is generated from a User Interface (UI) of the user device to create a connection between the at least two parties by a user. The method further includes facilitating, by the server system, a set of privacy options on the UI. The set of privacy options are at least an anonymous option representing an identity of the user being anonymous to the at least two parties and a public option representing the identity of the user visible to the at least two parties. Furthermore, the method includes receiving, by the server system, a privacy option selected from the set of privacy options from the user device. Thereafter, the method includes facilitating, by the server system, creation of the connection between the at least two parties in the application. The connection created at least includes the privacy option selected by the user.

In another embodiment, a server system includes at least one processor and at least one memory. The at least one memory having stored therein machine executable instructions, that when executed by the at least one processor, cause the server system to receive a user selection of at least two parties in an application from a list of a plurality of parties present on a user device. The user selection is generated from a UI of the user device to create a connection between the at least two parties by a user. The system is further caused to facilitate a set of privacy options on the UI for selection of the user. The set of privacy options are at least an anonymous option representing an identity of the user being anonymous to the at least two parties and a public option representing the identity of the user visible to the at least two parties. The system is further caused to receive a privacy option selected from the set of privacy options from the user device. The system is further caused to facilitate creation of the connection between the at least two parties in the application. The connection created at least includes the privacy option selected by the user.

In another embodiment, a computer-implemented method includes facilitating, by a user device, a profile creation of a user through a User Interface (UI) of the user device in an application available at the user device. The application is managed by a server system. The method further includes facilitating, by the user device, a user selection of contacts of at least two parties from a list of a plurality of contacts present on the user device through the UI. The method further includes facilitating a selection of a privacy option from a set of privacy options. The set of privacy options includes an anonymous option representing an identity of the user being anonymous to the at least two parties, and a public option representing the identity of the user visible to the at least two parties. Thereafter, the method includes sending, by the user device to the server system, the user selection of contacts and the selection of the privacy option. The server system is configured to create a connection between the at least two parties in the application.

BRIEF DESCRIPTION OF THE FIGURES

For a more complete understanding of example embodiments of the present technology, reference is now made to the following descriptions taken in connection with the accompanying drawings in which.

Figure 1:
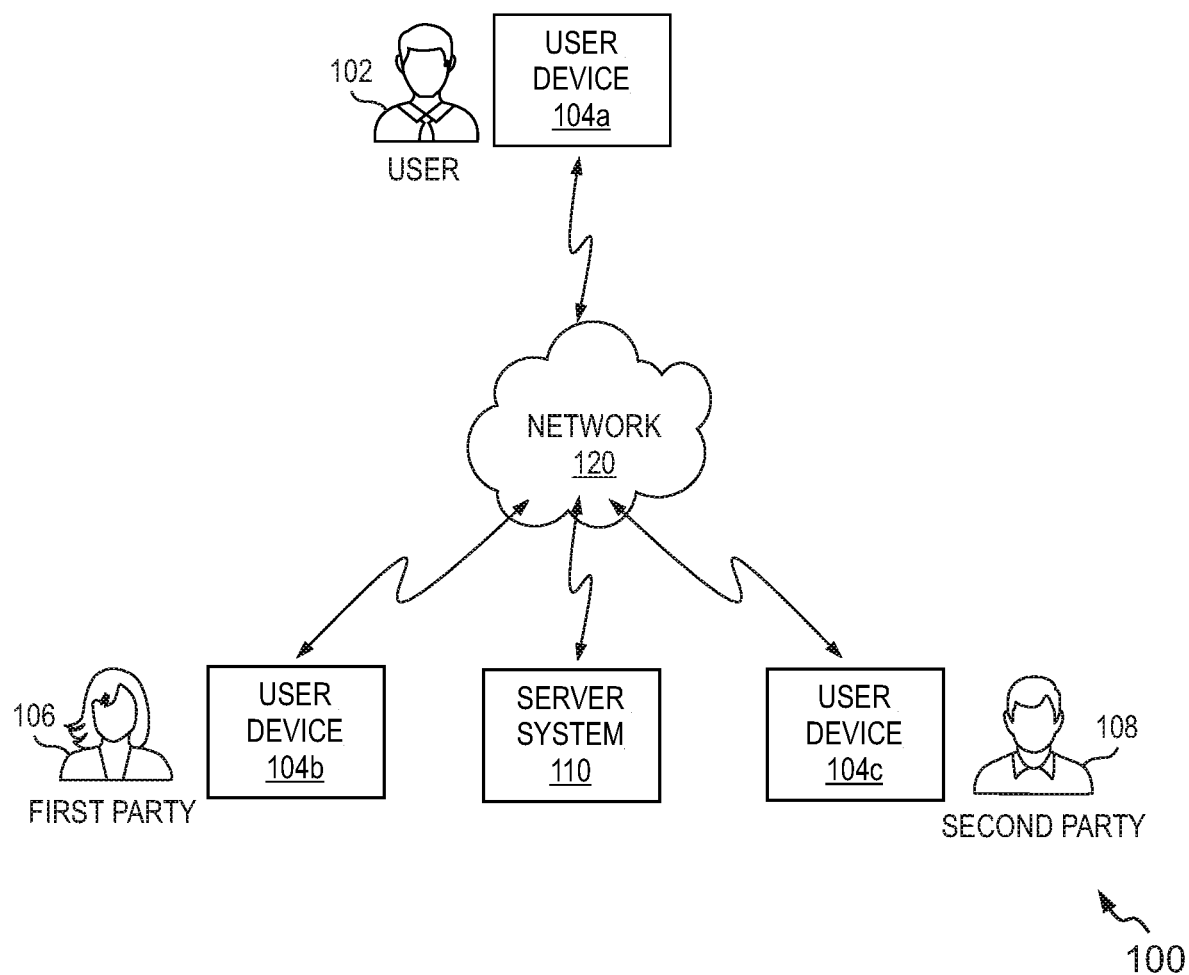
FIG. 1 shows an example representation of an environment for facilitating third party connections related to at least some embodiments of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

The term "third party connection" or "third party introduction" used throughout the present disclosure refers to the act of establishing a social network connection by a third person/entity between at least two parties/persons/entities who would potentially benefit from such introduction along with the third person's identity visible to the parties as per the choice of the third person. The term "third party connection" also includes facilitating direct communication between the at least two parties without involvement of the third person in some embodiments of the present disclosure.

In other embodiments of present disclosure, the term "third party connection" or "third party introduction" refer to a 'connection' as the act of the user selecting two or more parties to message and to create a profile for the connected parties/users to gain access to their list of 'connections'. It also refers to facilitating communication among the connected users via an in-application secure chat that is only accessible through the application with secure two-factor login process that validates the connected users' identity. Further, the connections (and their subsequent chats) can be blocked by either of the connected parties, thereby disabling further communication between the connected parties and preserving the privacy of the connected users.

The term "user" used throughout the present disclosure refers to a third person/entity such as, but not limited to, a friend, a matchmaker, a networker, a business owner, a financial advisor, an estate agent and the like who is willing to introduce and connect at least two parties/persons/entities for various social, professional or personal reasons such as dating, friendship, referring for a job, recommending a service provider, introducing business contacts and the like.

The terms "at least two parties" used throughout the present disclosure refers to persons/entities that take part in the third party connections. The at least two parties includes at least a first party being introduced to at least a second party by the user using contact information of each party retrieved from a list present on a user device of the user. The list corresponds to a contact list stored on the user device such as a mobile phone or a friends list being maintained by one or more different applications running on the user device. Accordingly, the contact information refers to a phone number, an email ID or any other ID used in other types of communication modes. Moreover, the user has the option to be a party introducing himself/herself to a second party or more for connection in some embodiments of the present disclosure.

Various embodiments disclosed herein provide methods and systems for facilitating third party connections. More specifically, a server system causes display of a UI using an application which facilitates selection of at least two parties/contacts by a user using a user device to establish a third party connection. The application further provisions a set of privacy options such as, but not limited to, being one of a public (not anonymous) option where the user is visible/known to the parties or an anonymous (private) option where the user is not visible to the parties. The server system is configured to optionally send a personal message composed by the user or a pre-composed message selected by the user as provisioned on the UI to the selected parties thereby establishing a simultaneous third party connection. In addition, the message includes a communication link to access the website or install the application using which the selected parties can communicate with each other. The communication is facilitated through a chat feature without the involvement of the user. Further, the server system enables registered users to validate/like/approve information/data related to various connections created by a plurality of registered users and connections received by the plurality of registered users. Moreover, the server system is configured to facilitate a connection feed page/leaderboard that may include information as found relevant/interesting for the user such as, but not limited to, other connections received by each of the selected parties (connected by the user), likes and comments associated with each connection received by each of the selected parties and the like. Various embodiments of the disclosure for facilitating third party connections are explained in detail herein with reference to FIGS. 1 to 11.

FIG. 1 shows an example representation of an environment 100 for facilitating third party connections related to at least some embodiments of the present disclosure. The environment 100 includes a user device 104a associated with a user 102, a user device 104b associated with a first party 106, and a user device 104c associated with a second party 108. The user devices 104a-c can communicate with one another and at least one server system such as the server system 110 over a communication network, such as the network 120. The network 120 may include wired networks, wireless networks and combinations thereof. Some non-limiting examples of the wired networks may include Ethernet, local area networks (LANs), fiber-optic networks, and the like. Some non-limiting examples of the wireless networks may include cellular networks like GSM/3G/4G/5G/

LTE/CDMA networks, wireless LANs, Bluetooth, Wi-Fi or ZigBee networks, and the like. An example of the combination of wired and wireless networks may include the Internet.

The user 102 is involved in establishing the third party connection between the first party 106 and the second party 108. The first party 106 and the second party 108 may connect to each other for various professional or personal reasons. It is noted that the user 102 may be enabled to establish third party connections among a plurality of parties. The user devices 104*a-c* are portable electronic or desktop devices configured with one or more user interfaces (not shown in FIG. 1) to interact with the user 102, the first party 106, and the second party 108. Examples of the user devices 104*a-c* include, but are not limited to, a personal computer (PC), a mobile phone, a tablet device, a Personal Digital Assistant (PDA), a voice activated assistant, a Virtual Reality (VR) device, an augmented reality device, a smartphone and a laptop. Examples of the user interface include, but are not limited to, a display screen, a keyboard, a mouse, a light pen, an appearance of desktop, illuminated characters and help messages.

The server system 110 may be configured to facilitate third party connection between the first party 106 and the second party 108 based on user request. In some embodiments, the server system 110 may be a physical computer or one or more cluster of computers while in other embodiments it may be virtualized server running on one or more physical computers under the control of a virtual machine provider. In another embodiment, the server system 110 may be allocated according to processor cycles and storage requirements rather than according to a number of computers. In at least one example embodiment, the server system 110 may correspond to a Web-based platform (for example, a cloud platform) capable of being accessed over a communication network, such as a network 120. The Web-based platform may provision third party connection application services as a Web service accessible through a Website. In such a scenario, a plurality of users and a plurality of parties selected by the plurality of users for third party connections may access the Website over the network 120 using Web browser applications installed in their respective user devices (such as the user devices 104*a-c*) and thereafter use the services for communicating with one another.

In at least one example embodiment, the server system 110 may also be configured to store a third party connection application program and provision instances of the application to end-users (such as the user 102, the first party 106 and the second party 108) on their respective user devices for facilitating the third party connection. The end-users may request the server system 110 to provision access to the application over the network 120. The instances of the application may thereafter be downloaded on the user devices (such as the user devices 104*a-c*) of the respective end-users in response to their request for access to the application. Alternatively, in some embodiments, the application may be factory installed within the user devices associated with the end-users and, as such, the users may not need to explicitly request the application from the server system 110.

In an example embodiment, based on the requirements of the underlying device platform or operating system being used by the user 102, multiple third party connection applications may be developed using different technologies. For example, the third party connection application may be implemented using a markup language such as HTML and related technologies displayed inside a web-browser technology such as Safari®, Firefox®, or Internet Explorer®. In yet another embodiment, the third party connection application may be a stand-alone application designed to be downloaded and run on a specific device such as a tablet, smartphone, virtual assistant, or smart device running the Apple iOS operating system, Android operating system, or any other operating system. The stand-alone applications may be created using a set of application programming interfaces (APIs) and libraries.

In one embodiment, the user 102 upon accessing the Website and/or the third party connection application associated with the server system 110 may be presented with one or more UIs displayed (not shown) on a display screen of the user device 104*a* to send a profile creation request to the server system 110 so as to utilize various features of the application upon registration/creation of the profile. The user 102 may hereinafter alternatively be referred to as a registered user having his/her profile created in the server system 110 using the application. When the profile is successfully created, the user 102 may be directed to a UI (such as a UI 200 explained in detail hereinafter) seeking permission to access a list of contacts present on the user device 104*a* (such as the phone contacts). The user 102 is enabled to send a selection of at least two parties/contacts (such as the first party 106 and the second party 108) from the list to the server system 110.

In an example embodiment, upon receiving the selection of at least two parties from the user 102 using his computing device 104*a*, the server system 110 is configured to send an SMS/push notification via the network 120 to the selected parties on their respective computing devices 104*b* and 104*c*. Thereafter, the first party 106 and the second party 108 can authenticate their identity over the network 120 via two-factor authentication process facilitated by the server system 110 (as shown by double sided arrows) which includes the corresponding logics of performing the authentication. For example, an SMS message containing a several-digit code and a 32-character authentication token can be transmitted via a securely-encrypted HTTPS (Hyper Text Transfer Protocol Secure) connection over the network 120. After the successful two-factor authentication, the first party 106 and the second party 108 may be enabled to communicate over a chat with each other. It is noted that the connected users can only communicate with one another using the third party connection application provided the connected users have not explicitly exchanged information outside of the application's context. At any time after the connection is made, either of the connected users may block the chat, which would alter the logic in the server system 110 and prevent the application from facilitating further communication between the connected users. The various UIs capable of facilitating third party connection and communication between the end users are explained hereinafter with reference to FIGS. 2-7.

Figure 2:
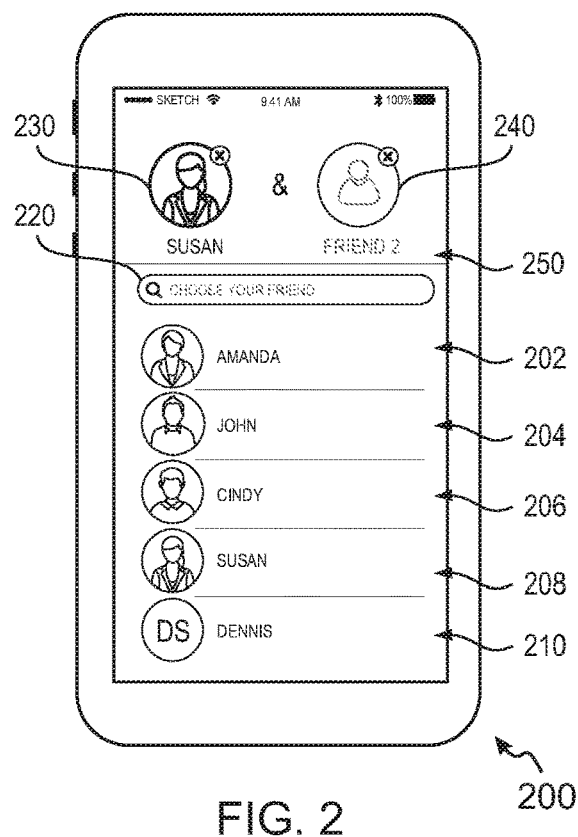
FIG. 2 shows a simplified representation of a UI displayed to a user for selecting parties to be connected, in accordance with an example embodiment of the present disclosure.

FIG. 2 shows a simplified representation of a UI 200 displayed to a user for selecting at least two parties to be connected, in accordance with an example embodiment of the present disclosure. It is noted that the Website and/or the third party connection application may include several UIs in addition to the UI 200. In one embodiment, the UI 200 is configured to provision a list of a plurality of parties present on a user device (such as the user device 104*a*) for user selection. As shown, the UI 200 is depicted to display a plurality of selectable icons such as 202, 204, 206, 208 and 210 respectively displaying a contact name and a profile picture (if available) of a plurality of parties present on the user device such as Amanda, John, Cindy, Susan and Dennis for user selection. In one embodiment, name initials of a party may be displayed in case a profile picture is not available for that particular party as exemplarily shown for Dennis (see, selectable icon 210) on the UI 200. It is noted that the selection of the at least two parties may be provided by a click input or a touch input or a voice input. Further, each of the at least two parties being connected may already be registered to the application (also referred to as 'registered users') or may not be registered to the application (also referred to as 'non-registered users').

As shown, a user (such as the user 102) has already selected the selectable icon 208 (i.e., Susan) as a first party (such as the first party 106) for establishing third party connection as displayed in a header portion 250 with a corresponding actionable icon 230. At any point, the user is enabled to de-select Susan as the first party using the actionable icon 230. For example, the user may click the (X) button associated with the actionable icon 230 which may de-select Susan as the first party. In addition, the user is enabled to edit Susan's name by selecting the name label portion of Susan's name. The head portion 250 further includes an actionable icon 240 with text 'Friend 2' showing that a second party is yet to be selected by the user. The UI 200 is further depicted to include a search box 220 with text 'choose your (1st, 2nd and so forth) friend'. The search box 220 when selected by the user enables the user for providing search input (e.g., in form of characters, numbers, etc.) for selecting the parties using the user device. Alternatively, the search box 220 may also be accompanied by a voice input button (not shown) allowing the user to provide search query in form of voice input.

The UI 200 including the selectable icons 202 to 210 is depicted herein for illustration purposes and the present disclosure is not limited to these selectable icons, and the UI 200 may include more or fewer actionable and/or selectable icons. Moreover, in some embodiments, one or more actionable and/or selectable icons may be implemented as free form text boxes or they may include drop-down menus or may be associated with check-boxes to enable user selection of options. In at least one example embodiment, the server system 110 may be configured to receive the at least two parties selected by the user as user input and direct the user to another UI (i.e., next step) for connecting/introducing both the parties. Such a UI is explained with reference to FIG. 3.

Figure 3:
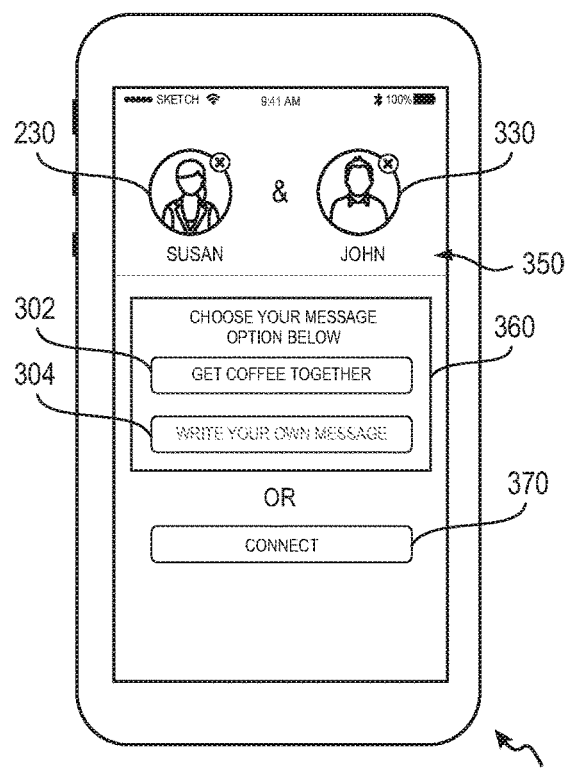
FIG. 3 shows a simplified representation of a UI configured to provision one or more options for notifying the parties, in accordance with an example embodiment of the present disclosure.

FIG. 3 shows a simplified representation of a UI 300 configured to provision one or more options for notifying the at least two parties, in accordance with an example embodiment of the present disclosure. In one embodiment, an introduction notification may be as simple as the identification information of the other party being introduced, or it may include text describing why the two parties should meet, an indication of how or for how long the user knows each of the parties, or other data. The UI 300 displays a header portion 350 depicted to further include the actionable icon 230 (i.e., Susan as selected to be the first party) and an actionable icon 330 (i.e., John selected using the selectable icon 204 of FIG. 2 to be the second party). In one embodiment, the user is enabled to de-select any of the selected parties using the actionable icons 230 and 330. For example, if the user decided to connect Cindy (see, selectable icon 206) and John (see, the selectable icon 204) instead of Susan (see, selectable icon 208), the user may click the (X) button associated with the actionable icon 230 which may de-select Susan as the first party and the user will be directed to the UI 200 for re-selecting Cindy (see, the selectable icon 206) as the first party.

The UI 300 is further depicted to include one or more options such as one or more pre-composed messages to be selected by the user or a personal message composed by the user to notify the selected parties of the connection. To that effect, a form field 360 with text to choose a message option from among a pre-composed message displayed using a selectable icon 302 and a personal message that can be composed by the user using a form field 304 may be provisioned. The selectable icon 302 exemplarily displays text 'Get coffee together' which if found relevant for the type of the connection may be selected by the user using a click/touch/voice input. Upon selection of one of the message options, the user may click a button 370 labeled 'Connect'. In one embodiment, the user may be enabled to skip selection of the one or more options provisioned on the UI 300 for notifying the parties and directly click the button 370. In both the scenarios, the server system 110 may be configured to direct the user to a UI for selecting privacy options. Such a UI is explained with reference to FIG. 4.

Figure 4:
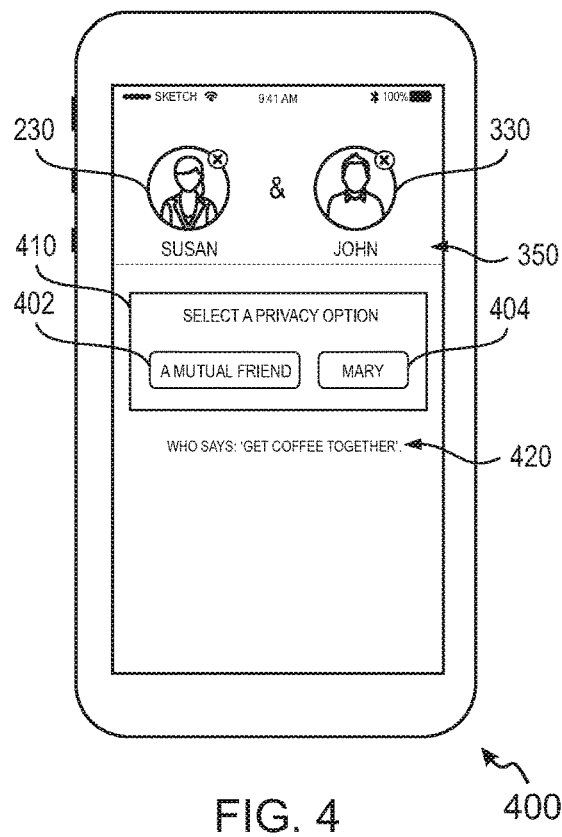
FIG. 4 shows a simplified representation of a UI configured to display a set of privacy options for user selection, in accordance with an example embodiment of the present disclosure.

FIG. 4 shows a simplified representation of a UI 400 configured to display a set of privacy options for user selection, in accordance with an example embodiment of the present disclosure. As shown, the UI 400 includes the header 350 and a form field 410 displaying the set of privacy options for user selection on the display screen of the user device. In one non-limiting embodiment, the set of privacy options includes an anonymous option and a public option. The anonymous option represents that an identity of the user would be anonymous to the at least two parties (e.g., Susan/the first party 106 and John/the second party 108). The public option represents that the identity of the user would be visible to the at least two parties. For example, the user may select a selectable icon 402 with text 'A mutual friend' if the user wants her identity to be anonymous to Susan and John. In other embodiments, the text on the selectable icon 402 may reflect terms such as a mutual contact, a mutual associate, a mutual connection, alias or only the name of the application for anonymously connecting the selected parties. Otherwise, the user may select a selectable icon 404 displaying text 'Mary' (being the name of the user) if she wants her identity visible/known to Susan and John.

The UI 400 further displays a message 420 with text 'who says: get coffee together.' as selected by the user using the selectable icon 302 on the UI 300. In an illustrative example of the one or more embodiments explained herein, Mary may be the user who thinks her friends John and Susan would make a great couple and therefore wants to introduce them by sending a message to get coffee together. In another non-limiting example, Mary may be a mutual reference for matching a prospective employee (John) with a prospective employer (Susan). The user may select the privacy option of her choice which may be received by the server system 110 as user input and accordingly the server system 110 may be configured to direct the user to another UI for confirming the messages to be sent to the at least two parties and finally connecting/introducing John and Susan (the at least two parties). Such a UI is explained with reference to FIG. 5.

Figure 5:
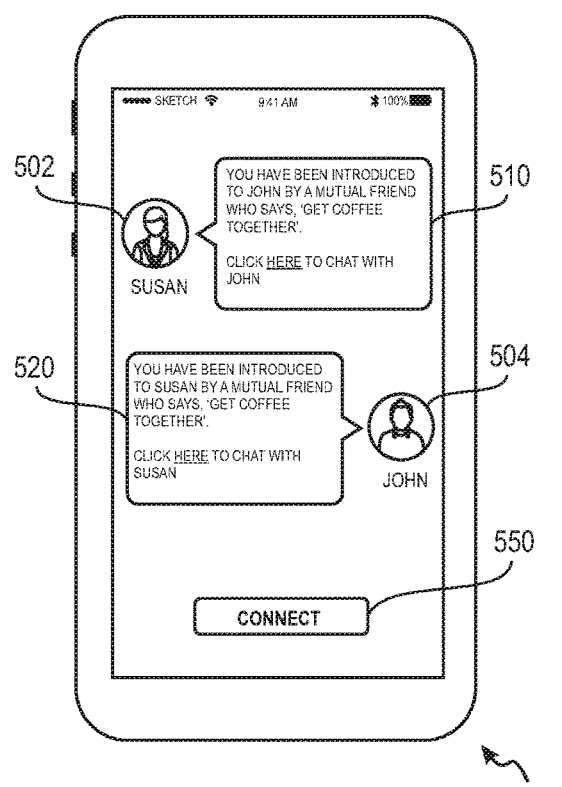
FIG. 5 shows a simplified representation of a UI configured to display a communication link to be opted by the parties for communication, in accordance with an example embodiment of the present disclosure.

FIG. 5 shows a simplified representation of a UI 500 configured to display the communication link for communication, in accordance with an example embodiment of the present disclosure. The UI 500 is configured to display one or more information fields 510 and 520 respectively to be sent to Susan (see, image icon 502) and John (see, image icon 504) on the display screen of the user device for user review before sending. The image icons 502 and 504 are configured to display identification information of Susan and John respectively which includes, such as, but not limited to name, profile picture, name initials, pet name, and the like. In some embodiments, the image icons 502 and 504 are selectable such that when selected will display additional information about the parties while in other embodiments, the image icons 502 and 504 may be provisioned only for displaying identity of the selected parties.

The information field 510 displays text 'you have been introduced to John by a mutual friend who says, get coffee together.' and 'click here to chat with John.' The information field 510 displays the exemplary text that can be sent to Susan by an SMS to notify Susan of the connection established by a mutual friend (Mary) with John. It is reflected from the text that Mary wants her identity to be anonymous to Susan (as she selected the selectable icon 402 with text 'A mutual friend' in FIG. 4). Further, the text includes either one of the optional pre-composed message or the optional personal message composed by the user using the UI 300. In at least one embodiment, the underlined word 'here' as present in the text includes a hyperlink associated with the word. The hyperlink may include the communication link which can be selected by Susan when she receives the SMS on her device. Upon selection, the link may direct Susan to an application store or a website for downloading the third party connection application on her device in order to chat with John.

Similarly, the information field 520 displays text 'you have been introduced to Susan by a mutual friend who says, get coffee together' and 'click here to chat with Susan.' As explained above, the information field 520 displays the exemplary text that can be sent to John by an SMS to notify John of the connection established by a mutual friend (as Mary selected the selectable icon 402 to stay anonymous) with Susan. Further, the underlined word 'here' as present in the text includes a hyperlink associated with the word. The hyperlink may include the communication link which can be selected by John when he receives the SMS on his device. Upon selection, the link may direct John to an application store or a website for downloading the third party connection application on his device in order to chat with Susan.

In one embodiment, if it is detected by the server system 110 that Susan and John have already installed the third party connection application in their respective devices (such as the user devices 104b and 104c), instead of an SMS, a push notification including a link to the application may be sent to both. In such scenarios, the hyperlink associated with the word 'here' upon selection may direct the respective parties directly to the application or a chat window in the application using which the parties can communicate directly with each other (i.e., without involvement of the user). Accordingly, the server system 110 is configured to modify the communication link to be opted by the selected parties based on the detection status.

In one embodiment, the detection status may have been stored in a database configured to store information of the registered users or may be retrieved from the respective user devices. In scenarios, where Mary may select her identity to be visible to John and Susan by selecting the selectable icon 404, a corresponding message including name of Mary (along with her last name if available) and the communication link to be opted by the parties may be sent by the server system 110. Even when the user identity is visible to the selected parties, the communication between the parties is enabled always without involvement of the user except when the user is one of the parties who selected one or more other parties for connection/introduction.

In various embodiments, the selected parties may be notified using other modes of communication such as but not limited to, an email, or a direct message via any other computer related software communicated through a deployment channel (for instance, Facebook® Messenger, iMessage of Apple® Inc., Instagram®, Snapchat®, Telegram™ messenger, Skype® and the like) or any other notification system being utilized by such deployment channels. In one example embodiment, a user may be enabled to connect friends of his/her friends from the list of friends being maintained by one or more above mentioned messenger applications that may be running on the user device.

The UI 500 is further depicted to include a button 550 labeled 'Connect' for user selection. After reviewing the messages to be sent to the selected parties, the user may select the button 550 to connect the selected parties. Upon receiving the selection, the server system 110 may be configured to direct the user to a UI (not shown) which may display information regarding successful connection of the parties on the display screen of the user device (such as the user device 104a).

Figure 6:
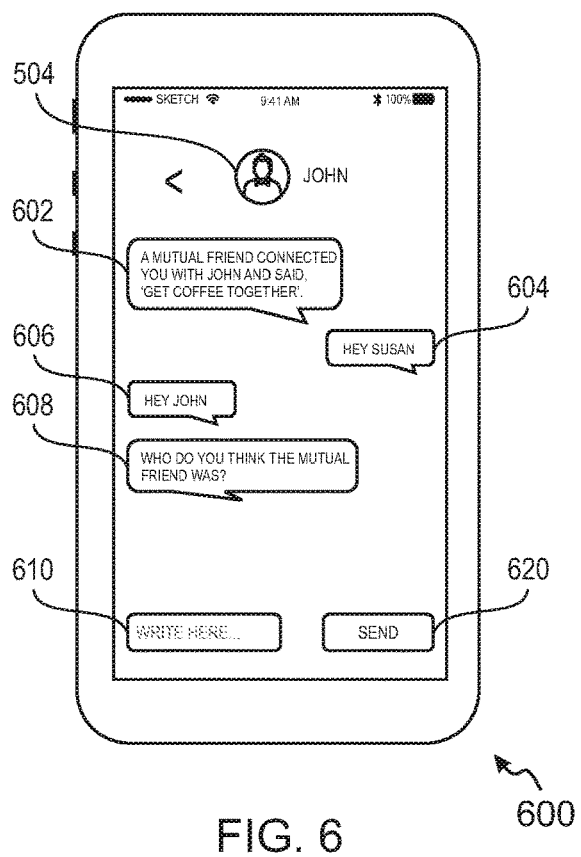
FIG. 6 shows a simplified representation of a UI configured to display a communication between the parties without involvement of the user, in accordance with an example embodiment of the present disclosure.

FIG. 6 shows a simplified representation of a UI 600 configured to display a communication between the at least two parties without involvement of the user, in accordance with an example embodiment of the present disclosure. The UI 600 is configured to provision a chat window on a display screen of the device (such as the user device 104b) associated with Susan using which she can initiate communication with John.

As shown, the UI 600 displays the image icon 504 showing the identification information of John (such as name and profile picture) as selected by Susan using another UI (not shown) for initiating the chat/communication. In one example embodiment, the server system 110 is configured to display a default informatory message 602 on the UI 600 with text 'A mutual friend connected you with John and said, get coffee together.' The message 602 may help Susan identify the purpose of connection as well as the identity of the user (if the public not anonymous option was selected) who connected her to John to initiate the chat.

The UI 600 further includes a form field 610 displaying text 'write here' using which Susan (the first party 106) can type a chat message to be sent to John (the second party 108). There is also provided a button 620 labeled 'Send' which can be clicked or touched by Susan to send the typed message such a message 604 with text 'Hey John'. In one embodiment, the UI 600 is configured to display the messages responded by John such as message 606 and message 608 respectively displaying text 'Hey Susan' and 'who do you think the mutual friend was?'. It is understood that the communication between Susan and John is facilitated by the server system 110 without the involvement of the user (i.e., Mary) who connected them.

Figure 7:
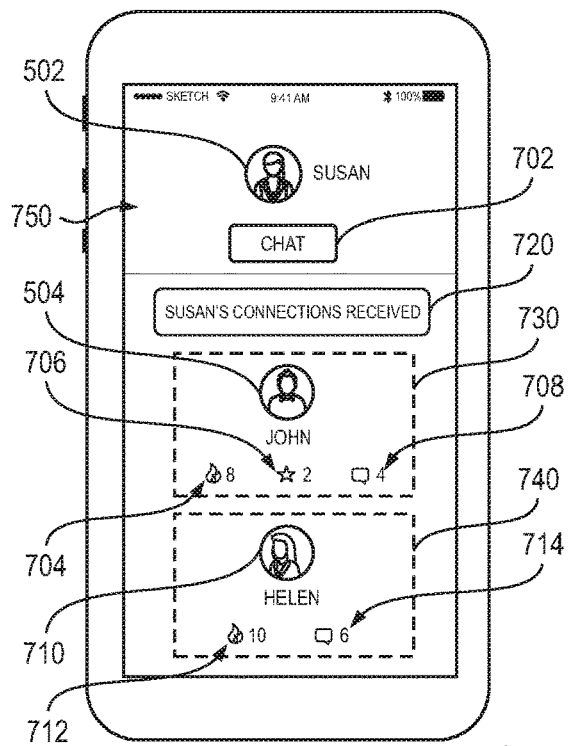
FIG. 7 shows a simplified representation of a UI configured to display a profile of a registered user as visible to a plurality of registered users, in accordance with an example embodiment of the present disclosure.

FIG. 7 shows a simplified representation of a UI 700 configured to display a profile of a registered user as visible to a plurality of registered users, in accordance with an example embodiment of the present disclosure. In an illustrative example, the registered user is John who is willing to view Susan's profile through the third party connection application running on his user device (such as the user device 104c). In one embodiment, John may wish to view Susan's profile for getting information about her as provisioned (and updated whenever she updates her profile or whenever she receives a new connection, like or comment) on her profile or to initiate communication with her. In other example embodiments, any registered user is enabled to view profile of another registered user by accessing the third party connection application using his/her user device.

As shown, a head portion 750 includes the image icon 502 that displays name and profile picture of Susan on her profile/profile page. The header portion 750 further includes a button 702 labeled 'chat' which may only be visible to registered users of the third party connection application and that has also been connected to the viewing user of that profile. (A user can only chat with another user if they have been connected to each other) By clicking the button 702, John may be directed to a UI such as the UI 600 where he can chat with Susan. It is noted that the communication between the application/Website on the user device associated with a registered user and the server system 110 may be performed in form of web requests. The web requests may be embodied in form of a data signal capable of being securely transmitted over a communication network, such as the network 120.

In one embodiment, the server system 110 is configured to provision information associated with connection received by each of the at least two parties on a plurality of UIs associated with a plurality of user devices of a plurality of registered users. The server system 110 is further configured to facilitate the plurality of registered users to validate/express opinion/like the connection using at least one of liking the information and commenting about the information. The UI 700 is depicted to display an information field 720 with text 'Susan's connections received'. The server system 110 is configured to display on the UI 700, one or more connections received by Susan as exemplarily depicted by boxes 730 and 740.

The box 730 is depicted to include the image icon 504 of John that displays name and profile picture of John. The box 730 further displays by a flame icon 704 with corresponding number 8 representing 8 registered users of the application liked/approved the connection of John and Susan, a star icon 706 with corresponding number 2 representing 2 registered users (one being Mary and two being another registered user) connected Susan and John, and a comments icon 708 with corresponding number 4 representing 4 registered users commented about the connection between John and Susan.

It is noted that the flame icon 704, the star icon 706 (along with the corresponding number) and the comments icon 708 are selectable which upon selection are configured to display additional information such as, but not limited to, names of the registered user who liked the connection, names of the registered users who repeatedly connected John and Susan, and names of the registered users who commented on the connection along with their respective comments. All such information may be displayed using one or more UIs (not shown) on the display screen of the user device associated with the registered user (such as John) who clicks either on the number associated with the flame icon 704 or the comments icon 708 or the number associated with the comments icon 708 for information retrieval. It is understood that the exact information corresponding to the connection between John and Susan may be displayed on the profile page of John (not shown) as visible to a plurality of registered users including Susan.

The box 740 is exemplarily depicted to include an image icon 710 displaying name and profile picture of a registered user named Helen as another connection received by Susan. It further includes a flame icon 712 with corresponding number 10 representing 10 registered users liked/approved the connection between Susan and Helen. In one example embodiment, the number (i.e., 10) associated with the flame icon 712, when clicked, will display a separate screen/UI showing all the users who liked the connection between Susan and John. It is noted that liking the connection includes endorsing, supporting favoring, admiring, embracing, or applauding the connection. Similarly a comments icon 714 with corresponding number 6 representing 6 registered users commented about the connection between Susan and Helen. As mentioned above, the flame icon 712 when selected by a registered user (such as John or Mary) may enable the user to like/dislike the connection. In various embodiments, the flame icon 712 may include different shapes such as a heart icon or thumbs up icon without limiting the scope of its functionality. Similarly, the comments icon 714 or the number associated with the comments icon 714 when selected by a registered user will display corresponding comments and names of the registered users who commented on the connection. In one embodiment, the registered users are enabled to upload a plurality of profile pictures on their profiles. Further, data associated with a registered user's created connections can also be liked/approved/commented by other registered users. Moreover, a registered user may be enabled to see all of his created connections with annotation (or use of an icon denoting) of 'privately created' and 'publically created' as applicable through a settings page which can be accessed through the profile page.

In one example embodiment, information such as all connections received is always publically posted on the respective profile of the registered user. For example, Jeff (a registered user) connects Tom (may or may not be a registered user) with Barry (may or may not be a registered user). The Tom-Barry connection is a connection created by Jeff and would show up on the connections created page that is accessed through the settings page which is accessed by Jeff through his profile page. Once Jeff connects Tom and Barry, then on Tom's profile page it shows Barry as a connection received and on Barry's profile page it shows Tom as a connection received. Further, on every profile page it only shows the connection received regardless of whether it was public or private, and it does not show that user's connection created. To view a registered user's connection created, that user must go to his/her respective profile page, tap/click on the settings icon and then tap on the connection created option. Also, such information is sent to the connection feed of other registered users' within the application if that other registered user's contact information is part of the list of contacts of the user that made the connection. In one example embodiment, the connection feed page may include information as found relevant/interesting for the user such as, but not limited to, other connections received by each of the selected parties (connected by the user), likes and comments associated with each connection received by each of the selected parties, likes and comments associated with the connections created by the user, status updates of the plurality of registered users, profile picture updates of the plurality of registered users and the like. It is noted that the activities stated above such as likes/comments/etc. will only show if that user who performed the action is part of the viewing user's contact list.

In at least one embodiment, the server system 110 is configured to rank each user from among the plurality of registered users based on a proprietary algorithm and formula available in the server system 110 using the number of connections created, connections received, likes and comments and so forth. In another embodiment, the server system 110 is configured to rank each connection from among a plurality of connections-based on an in-built proprietary algorithm and formula using the number of likes and/or number of comments received for each connections. In other embodiments, a ranking of the users may be computed based on the quality of their past introductions. The server system 110 is configured to utilize the rankings of the most connected users for various business and social aspects. For example, the user having a top most connection score or value with respect to the proprietary algorithm and formula developed using the number of connections created, connections received, likes, and/or comments and so forth, may be provided a public recognition/status, and/or a social gathering of the top most connected users may be facilitated on a periodic basis.

In one embodiment, the server system 110 may be configured to create a profile page with limited features for a non-registered user in the application if that non-registered user has been selected to be introduced/connected to another party. A non-registered user may only be displayed using his/her name initials without any profile pictures as he/she does not have the profile created in the server system 110. Further, the button 702 labeled 'chat' on a non-registered user's profile only exists if a registered user is viewing the profile of the non-registered user such that the registered user can chat with the non-registered user by clicking the button 702. This also applies if the user is also registered. The chat button only appears if the viewing user of that profile has been connected to that user who he/she is viewing the profile of.

Figure 8:
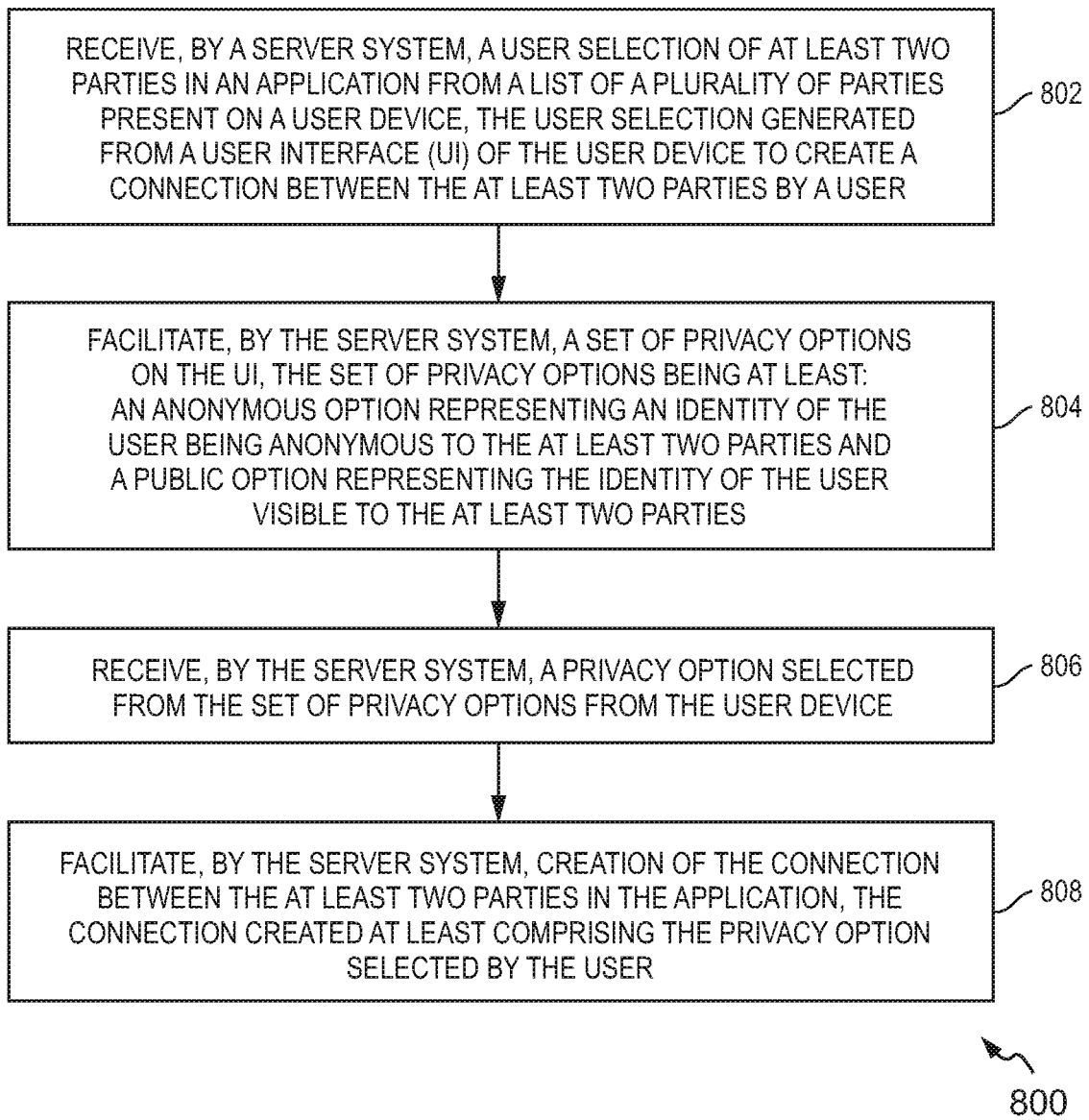
FIG. 8 is a flow diagram of a method for facilitating third party connections, in accordance with an example embodiment of the present disclosure.

FIG. 8 is a flow diagram of a method 800 for facilitating third party connections, in accordance with an example embodiment of the present disclosure. The various steps and/or operations of the flow diagram, and combinations of steps/operations in the flow diagram, may be implemented by, for example, hardware, firmware, a processor, circuitry and/or by the server system 110 of FIG. 1 and/or by a different electronic device associated with the execution of software that includes one or more computer program instructions.

At 802, a user selection of at least two parties in an application from a list of a plurality of parties present on a user device is received by a server system. The user selection is generated from a UI of the user device to create a connection between the at least two parties by a user. The server system (e.g., the server system 110) is configured to facilitate profile creation of the user, which further enables the user to select the at least two parties.

At 804, a set of privacy options are facilitated on the UI. The set of privacy options are at least an anonymous option representing an identity of the user being anonymous to the at least two parties and a public option representing the identity of the user visible to the at least two parties.

At 806, a privacy option selected from the set of privacy options from the user device is received.

At 808, creation of the connection between the at least two parties is facilitated in the application. The connection created at least includes the privacy option selected by the user. In one embodiment, the connection created also includes the selection of one of the pre-composed messages or personal message the user decides to compose if any at all. The server system may further be configured to facilitate a communication between the at least two parties without involvement of the user by electronically sending a communication link to be opted by the at least two parties where they would have the ability to communicate with each other directly. Moreover, the server system may be configured to provision information associated with connection received by each of the at least two parties on a plurality of UIs associated with a plurality of user devices of a plurality of registered users such that a plurality of registered users are enabled to approve the information using at least one of liking the information and commenting about the information.

Figure 9:
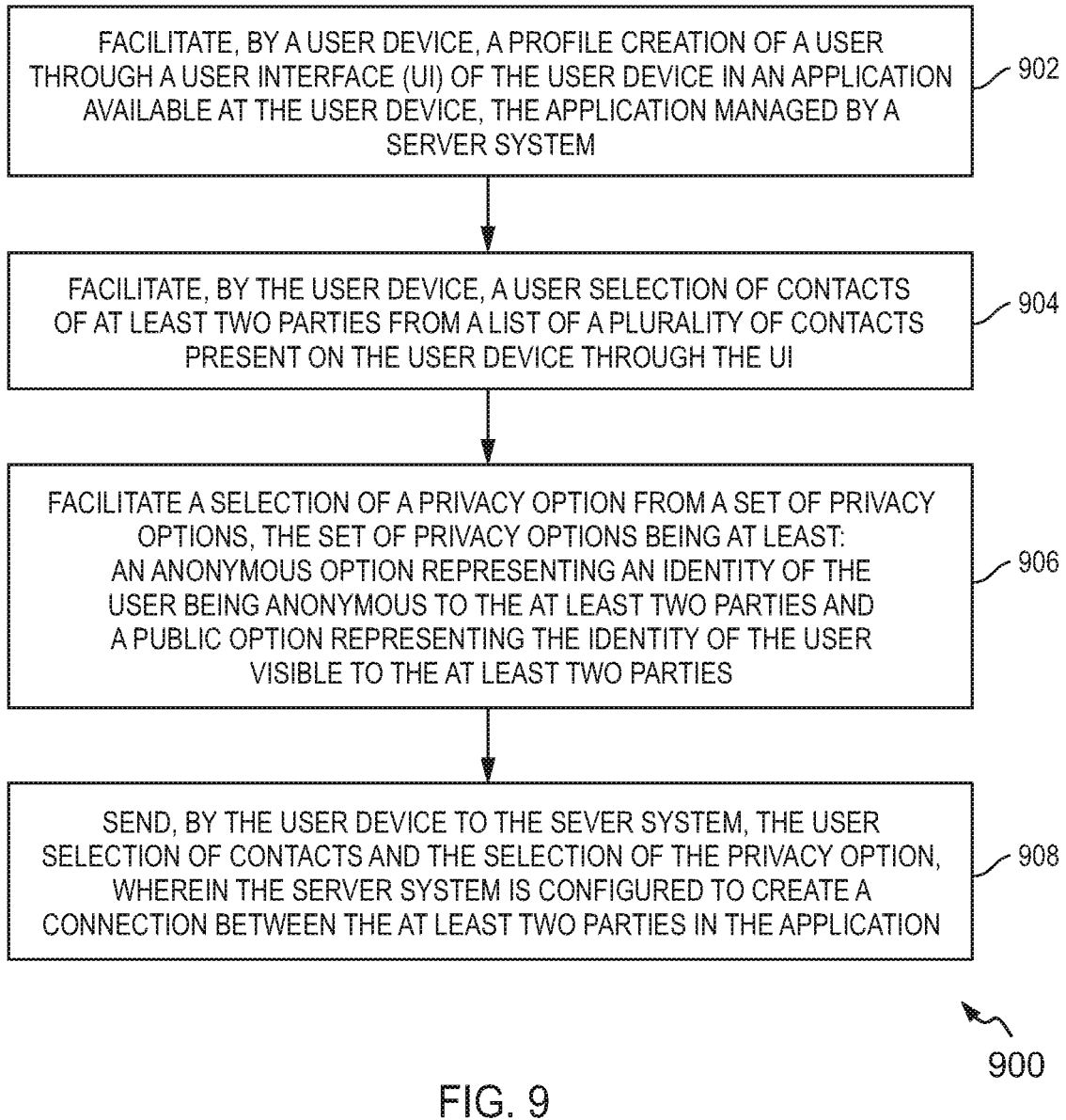
FIG. 9 is another flow diagram of a method for facilitating third party connections, in accordance with an example embodiment of the present disclosure.

FIG. 9 is a yet another flow diagram of a method 900 for facilitating third party connections, in accordance with an example embodiment of the present disclosure. The various steps and/or operations of the flow diagram, and combinations of steps/operations in the flow diagram, may be implemented by, for example, hardware, firmware, a processor, circuitry and/or by the user device 104a or by the server system 110 of FIG. 1 or by a combination thereof and/or by a different electronic device associated with the execution of software that includes one or more computer program instructions.

At 902, a profile creation of a user through a User Interface (UI) of a user device in an application available at the user device is facilitated. The application is managed by a server system. As explained with FIG. 1, a user (e.g., the user 102) using a user device (e.g., the user device 104a) may send a profile creation request to a server system (e.g., the server system 110) for utilizing various features of the third party connection application.

At 904, a user selection of contacts of at least two parties from a list of a plurality of contacts present on the user device through the UI is facilitated. As explained with reference to FIG. 2, the user may select the at least two parties using the UI 200.

At 906, a selection of a privacy option from a set of privacy options is facilitated. The set of privacy options are at least an anonymous option representing an identity of the user being anonymous to the at least two parties and a public option representing the identity of the user visible to the at least two parties.

At 908, the user selection of contacts and the selection of the privacy option is sent by the user device to the server system. The server system is configured to create a connection between the at least two parties in the application.

The disclosed methods 800 and 900 or one or more operations of the methods 800 and 900 may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components) and executed on a computer (e.g., any suitable computer, such as a laptop computer, net book, Web book, tablet computing device, smart phone, Artificial Intelligence, Virtual Reality device, virtual assistant, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Figure 10:
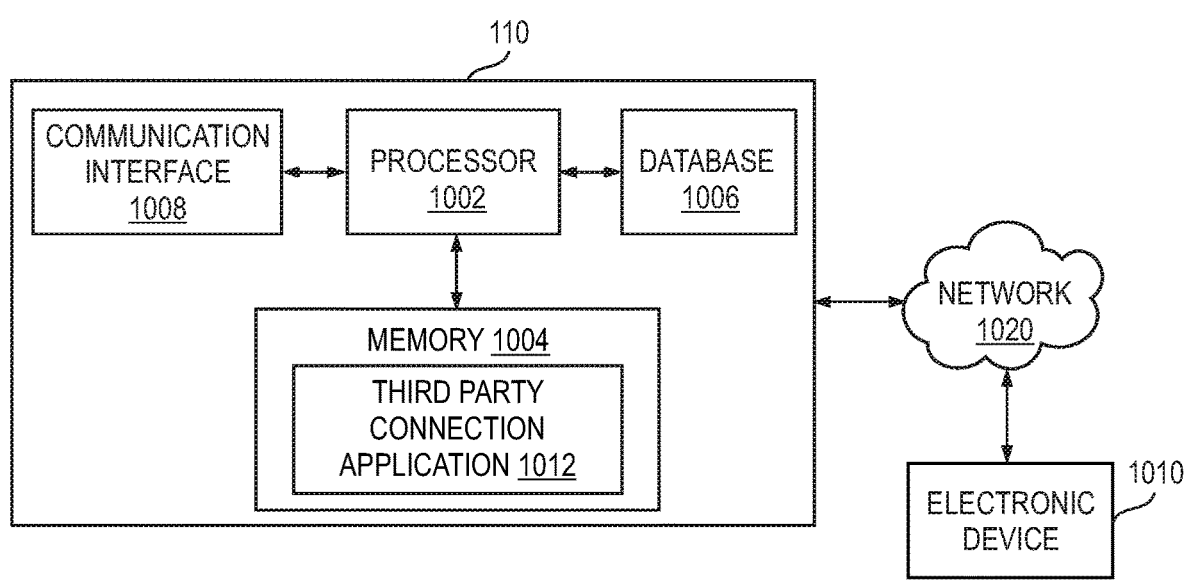
FIG. 10 shows a block diagram representation of a server system capable of implementing at least some embodiments of the present disclosure.

FIG. 10 shows a block diagram representation of the server system 110 capable of implementing the various embodiments of the present disclosure. The server system 110 includes at least one processor 1002, at least one memory 1004, a database 1006 and a communication interface 1008 for facilitating third party connections. The processor 1002 is operatively coupled with the memory 1004, the database 1006 and the communication interface 1008. In at least one embodiment, the server system 110 may be accessible to user electronic devices, such as an electronic device 1010, through a communication network, such as the network 1020.

The database 1006 is any computer-operated hardware suitable for storing and/or retrieving data, such as, but not limited to, the profiles of a plurality of users, number of likes/approvals received by each user on his/her connections received with other users, number of likes/approval received by each user on his/her created connections, comments made by each registered user, profile pages created for registered and non-registered users and the like. The database 1006 may include multiple storage units such as hard disks and/or solid-state disks in a redundant array of inexpensive disks (RAID) configuration. The database 1006 may include a storage area network (SAN) and/or a network attached storage (NAS) system. In some alternate embodiments, the database 1006 may also include magnetic storage devices (such as hard disk drives, floppy disks, magnetic tapes, etc.), optical magnetic storage devices (e.g., magneto-optical disks), semiconductor memories (such as mask ROM, PROM (programmable ROM), EPROM (erasable PROM), Phase-change memory, flash ROM, RAM (random access memory)), etc. The server system 110 include one or more storage interfaces for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 1002 with access to the database 1006.

The processor 1002 is capable of executing the stored machine executable instructions of a third party connection application 1012 in the memory 1004 or within the processor 1002 or any storage location accessible to the processor 1002. The processor 1002 is configured to perform the various operations as explained with reference to methods 800 and 900. For example, the processor 1002 is configured to receive a user selection of at least two parties (such as the first party 106/Susan and the second party 108/John) in an application from a list of a plurality of parties present on a user device (such as the electronic device 1010) to create a connection between the at least two parties by a user (such as the user 102). The processor 1002 is also configured to facilitate the option of selecting a pre-composed message or personally composed message. The processor 1002 is further configured to facilitate a set of privacy options on the UI for selection of the user. The set of privacy options include an anonymous option and a public option. The processor 1002 is configured to facilitate creation of the connection between the at least two parties in the application that includes the privacy option selected by the user. The processor 1002 is further configured to provision information associated with connection received by each of the at least two parties on the plurality of UIs associated with the plurality of user devices (such as the electronic device 1010) of the plurality of registered users in order to facilitate the plurality of registered users to approve the information by way of liking the information and/or commenting about the information. The processor 1002 is also configured to utilize a proprietary algorithm of the number of connections created and connections received to establish popularity and ranking of all the registered users.

In an embodiment, the processor 1002 may be embodied as one or more of various processing devices, such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

The memory 1004 may be configured to store the machine executable instructions of the third party connection application 1012 for the processor 1002 to execute for facilitating third party connections. The memory 1004 is a storage device embodied as one or more volatile memory devices, one or more non-volatile memory devices, and/or a combination of one or more volatile memory devices and non-volatile memory devices, for storing micro-contents information and instructions. The memory 1004 may be embodied as magnetic storage devices (such as hard disk drives, floppy disks, magnetic tapes, etc.), optical magnetic storage devices (e.g., magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash ROM, RAM (random access memory), etc.).

The communication interface 1008 is configured to facilitate communication between the server system 110 and user devices associated with end-users. The communication interface 1008 is configured to cause display of UIs on the user devices (such as the user devices 104a-c of FIG. 1), such as the UIs 200-700, thereby enabling the end-users to communicate with one another. The processor 1002, in conjunction with the communication interface 1008, may be configured to facilitate a communication between the at least two parties without involvement of the user by sending a communication link to be opted by the at least two parties to be able to communicate with each other. Further, the processor 1002 may be configured to notify the at least two parties with one of one or more pre-composed messages provisioned on the UI and selected by the user or a personal message composed by the user through the UI using the communication interface 1008. The communication may be achieved over a communication network, such as the network 1020.

In at least some example embodiment, the server system 110 may include an I/O module (not shown in FIG. 10) configured to receive inputs from and provide outputs to the users of the server system 110. To that effect, the I/O module may include at least one input interface and/or at least one output interface. Examples of the input interface may include, but are not limited to, a keyboard, a mouse, a joystick, a keypad, a touch screen, soft keys, a microphone, and the like. Examples of the output interface may include, but are not limited to, a UI display (such as a light emitting diode display, a thin-film transistor (TFT) display, a liquid crystal display, an active-matrix organic light-emitting diode (AMOLED) display, etc.), a microphone, a speaker, a ringer, a vibrator, and the like.

Figure 11:
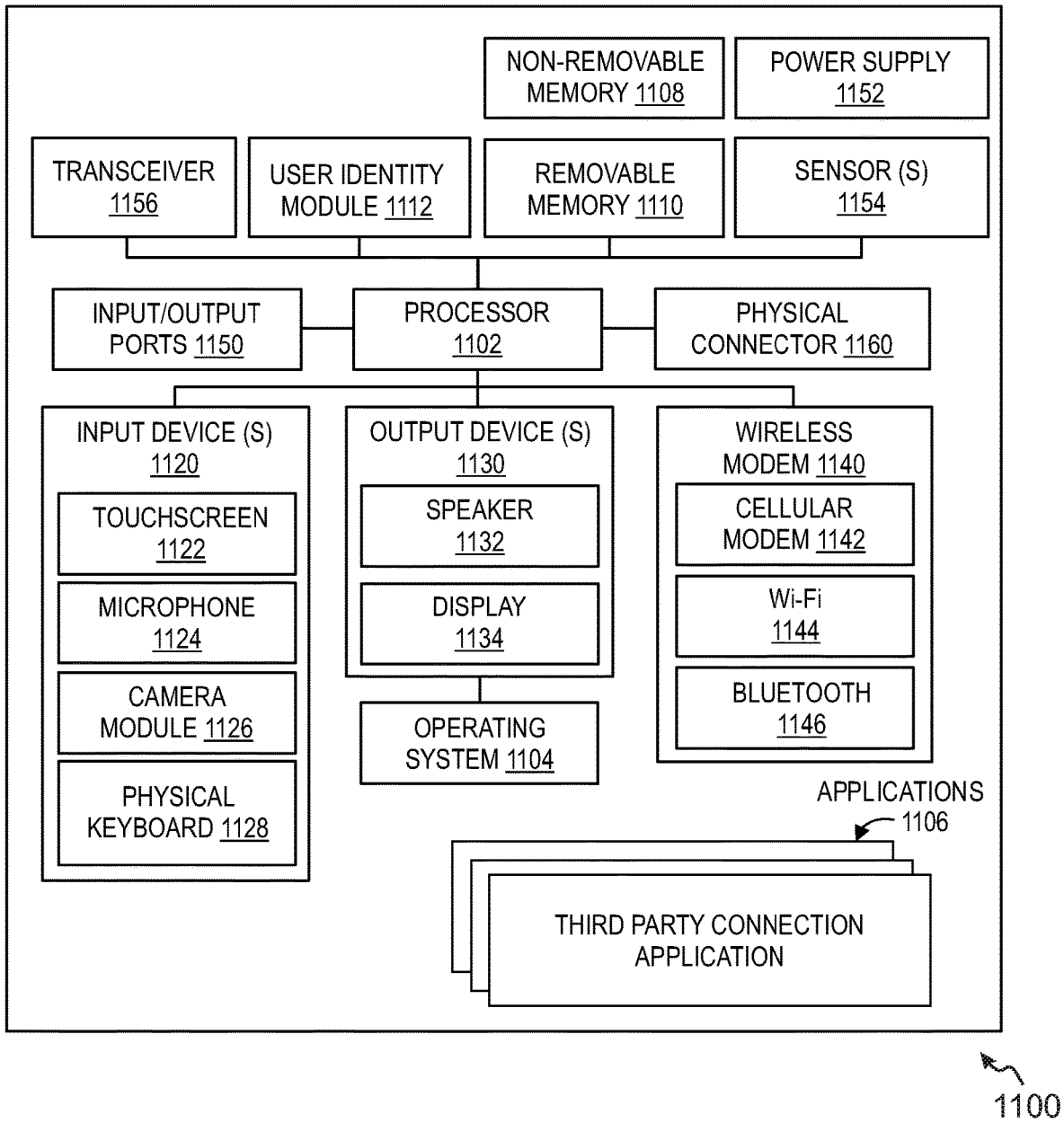
FIG. 11 shows a computing device capable of implementing at least some embodiments of the present disclosure.

FIG. 11 illustrates a computing device 1100 capable of implementing the various embodiments of the present disclosure. In an embodiment, the various operations performed by the server system 110 may be implemented using an application in a computing device, such as the computing device 1100. For example, the computing device 1100 may correspond to a device corresponding to an end-user being any one of a registered user willing to establish third party connection or at least two parties selected by the registered user for establishing the third party connection between them. For example, the computing device 1100 is example of any of the user devices 104*a-c*. The computing device 1100 is depicted to include one or more applications 1106, including an application for third party connection, which serves as an instance of the application downloaded from the server system 110 and capable of communicating through web requests with the server system 110 to facilitate third party connections/introductions.

It should be understood that the computing device 1100 as illustrated and hereinafter described is merely illustrative of one type of device and should not be taken to limit the scope of the embodiments. As such, it should be appreciated that at least some of the components described below in connection with that the computing device 1100 may be optional and thus in an example embodiment may include more, less or different components than those described in connection with the example embodiment of the FIG. 11. As such, among other examples, that the computing device 1100 could be any of a mobile electronic devices, for example, cellular phones, tablet computers, laptops, mobile computers, desktop computers, personal digital assistants (PDAs), artificial intelligence, augmented reality applications, virtual reality devices, virtual assistants, mobile televisions, mobile digital assistants, or any combination of the aforementioned, and other types of communication or multimedia devices.

The illustrated computing device 1100 includes a controller or a processor 1102 (e.g., a signal processor, microprocessor, ASIC, or other control and processing logic circuitry) for performing such tasks as signal coding, data processing, image processing, input/output processing, power control, and/or other functions. An operating system 1104 controls the allocation and usage of the components of the computing device 1100 and support for one or more applications programs (see, applications 1106), such as third party connection application, that implements one or more of the innovative features described herein. In addition to third party connection application, the applications 1106 may include common mobile computing applications (e.g., telephony applications, email applications, calendars, contact managers, web browsers, messaging applications) or any other computing application. The third party connection application, in at least one example embodiment, may be configured to provide the logic to facilitate third party connections, as explained with reference to FIGS. 1 to 7.

The illustrated computing device 1100 includes one or more memory components, for example, a non-removable memory 1108 and/or removable memory 1110. The non-removable memory 1108 can include RAM, ROM, flash memory, a hard disk, or other well-known memory storage technologies. The removable memory 1110 can include flash memory, smart cards, or a Subscriber Identity Module (SIM). The one or more memory components can be used for storing data and/or code for running the operating system 1104 and the applications 1106. The computing device 1100 may further include a user identity module (UIM) 1112. The UIM 1112 may be a memory device having a processor built in. The UIM 1112 may include, for example, a subscriber identity module (SIM), a universal integrated circuit card (UICC), a universal subscriber identity module (USIM), a removable user identity module (R-UIM), or any other smart card. The UIM 1112 typically stores information elements related to a mobile subscriber. The UIM 1112 in form of the SIM card is well known in Global System for Mobile Communications (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The computing device 1100 can support one or more input devices 1120 and one or more output devices 1130. Examples of the input devices 1120 may include, but are not limited to, a touch screen 1122 (e.g., capable of capturing finger tap inputs, finger gesture inputs, multi-finger tap inputs, multi-finger gesture inputs, or keystroke inputs from a virtual keyboard or keypad), a microphone 1124 (e.g., capable of capturing voice input), a camera module 1126 (e.g., capable of capturing still picture images and/or video images) and a physical keyboard 1128. Examples of the output devices 1130 may include, but are not limited to a speaker 1132 and a display 1134. Other possible output devices (not shown in the FIG. 11) can include piezoelectric or other haptic output devices. Some devices can serve more than one input/output function. For example, the touch screen 1122 and the display 1134 can be combined into a single input/output device.

A wireless modem 1140 can be coupled to one or more antennas (not shown in the FIG. 11) and can support two-way communications between the processor 1102 and external devices, as is well understood in the art. The wireless modem 1140 is shown generically and can include, for example, a cellular modem 1142 for communicating at long range with the mobile communication network, a Wi-Fi compatible modem 1144 for communicating at short range with an external Bluetooth-equipped device or a local wireless data network or router, and/or a Bluetooth-compatible modem 1146. The wireless modem 1140 is typically configured for communication with one or more cellular networks, such as a GSM network for data and voice communications within a single cellular network, between cellular networks, or between the computing device 1100 and a public switched telephone network (PSTN).

The computing device 1100 can further include one or more input/output ports 1150, a power supply 1152, one or more sensors 1154 for example, an accelerometer, a gyroscope, a compass, or an infrared proximity sensor for detecting the orientation or motion of the computing device 1100, a transceiver 1156 (for wirelessly transmitting analog or digital signals) and/or a physical connector 1160, which can be a USB port, IEEE 1294 (FireWire) port, and/or RS-232 port. The illustrated components are not required or all-inclusive, as any of the components shown can be deleted and other components can be added.

Various example embodiments offer, among other benefits, techniques for establishing a social network for new introductions and connections. The methods and systems disclosed herein are beneficial to several categories of entities such as a person willing to make a third party connection with his identity visible, a person willing to make an anonymous third party connection, a person willing to be exposed to more opportunities to meet new people for various activities or purposes, a person willing to form new relationships, a person who is specifically considered as connector within a community, couples or a group of people willing to be ranked in terms of various metrics and the like. Further, the user has the benefit of making quick and easy third party connections without having to contact each individual separately. The user has the benefit of staying anonymous which reduces the risk of the user experiencing any negative consequences of a potentially failed connection or putting the user's reputation with one of the parties at risk. The user has the benefit of getting his introductions that he created or received validated by other registered users in the form of comments and likes. The user has the benefit of having his connections being ranked for various metrics or standards. The parties connected have the benefit of freely communicating with each other without involvement of the user. Neither of the connected parties has access to the other's contact information.

Although the disclosure has been described with reference to specific exemplary embodiments, it is noted that various modifications and changes may be made to these embodiments without departing from the broad spirit and scope of the disclosure. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the systems and methods may be embodied using transistors, logic gates, and electrical circuits (for example, application specific integrated circuit (ASIC) circuitry and/or in Digital Signal Processor (DSP) circuitry).

Particularly, the server system 110 and its various components may be enabled using software and/or using transistors, logic gates, and electrical circuits (for example, integrated circuit circuitry such as ASIC circuitry). Various embodiments of the disclosure may include one or more computer programs stored or otherwise embodied on a computer-readable medium, wherein the computer programs are configured to cause a processor or computer to perform one or more operations (for example, operations explained herein with reference to FIGS. 8 and 9). A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Various embodiments of the disclosure, as discussed above, may be practiced with steps and/or operations in a different order, and/or with hardware elements in configurations, which are different than those which, are disclosed. Therefore, although the disclosure has been described based upon these exemplary embodiments, it is noted that certain modifications, variations, and alternative constructions may be apparent and well within the spirit and scope of the disclosure.

Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A computer-implemented method, comprising:
receiving, by a server system, a user selection of at least two parties in an application from a list of a plurality of parties present on a user device, the user selection generated from a User Interface (UI) of the user device to create a connection between the at least two parties by a user;
facilitating, by the server system, a selection of an anonymous option by the user on the UI, wherein the anonymous option renders an identity of the user as anonymous to the at least two parties;
receiving, by the server system, the selection of the anonymous option from the user device via the UI; and
facilitating, by the server system, creation of the connection between the at least two parties in the application in accordance with the selected anonymous option.

2. The method of claim 1, further comprising:
facilitating a direct communication between the at least two parties without disclosing contact information related to the at least two parties between the at least two parties.

3. The method of claim 2, further comprising:
electronically sending a communication link to be opted by the at least two parties for the direct communication.

4. The method of claim 1, further comprising:
notifying the at least two parties with a pre-composed message selected by the user, the pre-composed message provisioned on the UI.

5. The method of claim 1, further comprising:
notifying the at least two parties with a personal message composed by the user through the UI.

6. The method of claim 1, further comprising:
provisioning information associated with connection received by each of the at least two parties on a plurality of UIs associated with a plurality of user devices of a plurality of registered users; and facilitating the plurality of registered users to approve the information, wherein the approval comprises at least one of liking the information and commenting about the information.

7. The method of claim 6, further comprising:
ranking each user from among the plurality of registered users based on at least one of:
a number of connections created;
a number of connections received;
a number of likes; and
a number of comments.

8. The method of claim 1, further comprising:
ranking each connection from among a plurality of connections based on at least one of:
a number of likes; and
a number of comments received.

9. The method of claim 1, further comprising:
facilitating a connection between the user and at least one party from the list of the plurality of parties present on the user device.

10. A server system, comprising:
at least one processor; and
at least one memory, the at least one memory having stored therein machine executable instructions, that when executed by the at least one processor, cause the server system to:
receive a user selection of at least two parties in an application from a list of a plurality of parties present on a user device, the user selection generated from a User Interface (UI) of the user device to create a connection between the at least two parties by a user;
facilitate a selection of an anonymous option by the user on the UI, wherein the anonymous option renders an identity of the user as anonymous to the at least two parties;
receive the selection of the anonymous option from the user device; and
facilitate creation of the connection between the at least two parties in the application in accordance with the selected anonymous option.

11. The server system of claim 10, wherein the server system is further caused to:
facilitate a direct communication between the at least two parties without disclosing contact information related to the at least two parties between the at least two parties.

12. The server system of claim 11, wherein the server system is further caused to:
electronically sending a communication link to be opted by the at least two parties for the direct communication.

13. The server system of claim 10, wherein the server system is further caused to:
notify the at least two parties with a pre-composed message selected by the user, the pre-composed message provisioned on the UI.

14. The server system of claim 10, wherein the server system is further caused to:
notify the at least two parties with a personal message composed by the user through the UI.

15. The server system of claim 10, wherein the server system is further caused to:
provision information associated with connection received by each of the at least two parties on a plurality of UIs associated with a plurality of user devices of a plurality of registered users; and
facilitate the plurality of registered users to approve the information, wherein the approval comprises at least one of liking the information and commenting about the information.

16. The server system of claim 15, wherein the server system is further caused to:
rank each user from among the plurality of registered users based on at least one of:
a number of connections created;
a number of connections received;
a number of likes; and
a number of comments.

17. The server system of claim 10, wherein the server system is further caused to:
rank each connection from among a plurality of connections based on at least one of:
a number of likes: and
a number of comments received.

18. A computer-implemented method, comprising:
facilitating, by a user device, a profile creation of a user through a User Interface (UI) of the user device in an application available at the user device, the application managed by a server system;
facilitating, by the user device, a user selection of contacts of at least two parties from a list of a plurality of contacts present on the user device through the UI;
facilitating a selection of an anonymous option by the user on the UI, wherein the anonymous option renders an identity of the user as anonymous to the at least two parties;
and
sending, by the user device to the server system, the user selection of contacts and the selection of the anonymous option,
wherein the server system is configured to create a connection between the at least two parties in the application in accordance with the selected anonymous option.

19. The method of claim 18, wherein the server system is further configured to facilitate a direct communication between the at least two parties without disclosing contact information related to the at least two parties between the at least two parties.

20. The method of claim 19, wherein the server system is further configured to electronically send a communication link to be opted by the at least two parties for the direct communication.

\* \* \* \* \*